United States Patent
Yoon et al.

(10) Patent No.: US 7,524,216 B2
(45) Date of Patent: Apr. 28, 2009

(54) THREE-DIMENSIONAL ELECTRODE TERMINAL FOR POUCH-TYPED BATTERY

(75) Inventors: Junill Yoon, Seoul (KR); Jaesung Ahn, Busan (KR); Heekook Yang, Daejeon (KR); Jisang Yu, Daejeon (KR)

(73) Assignee: LG Chem, Ltd. (KR)

( * ) Notice: Subject to any disclaimer, the term of this patent is extended or adjusted under 35 U.S.C. 154(b) by 13 days.

(21) Appl. No.: 11/430,438

(22) Filed: May 9, 2006

(65) Prior Publication Data
US 2006/0263683 A1  Nov. 23, 2006

(30) Foreign Application Priority Data
May 9, 2005  (KR) .................. 10-2005-0038393

(51) Int. Cl.
*H01R 4/28* (2006.01)
(52) U.S. Cl. .................................. 439/754
(58) Field of Classification Search ............. 439/754, 439/677, 680, 521, 755–759, 504, 829, 822, 439/771–773
See application file for complete search history.

(56) References Cited

U.S. PATENT DOCUMENTS

| | | | | |
|---|---|---|---|---|
| 5,183,419 | A * | 2/1993 | Dewar ..................... | 439/765 |
| 5,413,500 | A * | 5/1995 | Tanaka .................... | 439/521 |
| 5,742,715 | A * | 4/1998 | Boehlke et al. .......... | 385/32 |
| 6,183,412 | B1 * | 2/2001 | Benkowski et al. ...... | 600/16 |
| 6,533,619 | B2 * | 3/2003 | Wakata et al. ........... | 439/680 |
| 6,623,314 | B1 * | 9/2003 | Cox et al. ................ | 439/759 |
| 6,802,747 | B1 * | 10/2004 | Orange .................... | 439/773 |
| 6,830,490 | B2 * | 12/2004 | Murakami et al. ....... | 439/755 |
| 6,848,807 | B2 * | 2/2005 | Guerrieri ................. | 362/155 |
| 6,875,061 | B2 * | 4/2005 | Daugherty et al. ...... | 439/769 |
| 7,029,338 | B1 * | 4/2006 | Orange et al. ........... | 439/755 |
| 7,077,711 | B1 * | 7/2006 | Moore ..................... | 439/864 |
| 7,104,815 | B2 * | 9/2006 | Ng et al. .................. | 439/135 |
| 2001/0027063 | A1 * | 10/2001 | Wakata et al. ........... | 439/680 |
| 2001/0053636 | A1 * | 12/2001 | Tamai et al. ............. | 439/677 |

FOREIGN PATENT DOCUMENTS

KR  10-2006-0073385  6/2006

* cited by examiner

*Primary Examiner*—Jean F Duverne
(74) *Attorney, Agent, or Firm*—Cantor Colburn LLP

(57) ABSTRACT

Disclosed herein is a three-dimensional electrode terminal of a battery having an electrode assembly mounted in a pouch-shaped case, wherein a part of the electrode terminal, which is exposed from the battery case, has a predetermined thickness, and has a perpendicular surface (a perpendicular end surface) formed on the end thereof. According to the present invention, it is possible to easily accomplish the connection between the electrode terminal and the electrically connecting member without modifying the shape of the electrode terminal, and it is possible to easily accomplish the connection for detecting the voltage, the current, and the temperature of the battery. Furthermore, the mechanical strength of the three-dimensional electrode terminal according to the present invention is higher than that of the conventional plate-shaped electrode terminal. Consequently, the stability of the three-dimensional electrode terminal is high in the state that the electrode terminal is electrically connected with the electrically connecting member, and the electrical connection is easily accomplished even in a small space, especially when batteries are stacked one on another with high density so as to manufacture a medium- or large-sized battery module.

12 Claims, 7 Drawing Sheets

THREE-DIMENSIONAL ELECTRODE TERMINAL FOR POUCH-TYPED BATTERY

FIELD OF THE INVENTION

The present invention relates to a three-dimensional electrode terminal for pouch-shaped batteries, and, more particularly, to a three-dimensional electrode terminal wherein a part of the electrode terminal, which is exposed from a battery case, has a predetermined thickness, and has a perpendicular surface (a perpendicular end surface) formed on the end thereof.

BACKGROUND OF THE INVENTION

As mobile devices have been increasingly developed, and the demand of such mobile devices has increased, the demand of secondary batteries has also sharply increased as an energy source for the mobile devices. Also, much research on batteries satisfying various needs has been carried out.

In terms of the material for the battery, the demand of a lithium secondary battery, such as a lithium cobalt polymer battery, having high energy density, high discharge voltage, and high output stability, is very high. In terms of the shape of the battery, the demand of a rectangular battery or a pouch-shaped battery, which is thin enough to be applied to products, such as mobile phones, and can be stacked with high integration sufficient to be used as a battery for battery modules, is very high. Especially, the pouch-shaped battery is very light and can be manufactured with low costs, and therefore, the pouch-shaped battery is widely used as an energy source for medium- or large-sized devices as well as small-sized mobile devices.

In spite of the above-described advantages, however, the pouch-shaped battery has the following several problems when the pouch-shaped battery is used as the battery for battery modules.

Specifically, the pouch-shaped battery has plate-shaped electrode terminals, which protrude outward from one end of the battery. For this reason, it is difficult to accomplish an electrical connection when a battery module is manufactured using the pouch-shaped battery. Generally, the connection of the electrode terminals is accomplished by welding the corresponding electrode terminals using wires, plates, or bus bars, or by connecting the corresponding electrode terminals using a spring force or another pressure. However, it is difficult to apply the above-described connection methods to the plate-shaped electrode terminals. Generally, the plate-shaped electrode terminals are partially bent such that each plate-shaped electrode terminal has a surface perpendicular to the battery, and the plates or the bus bars are welded to the perpendicular surfaces of the plate-shaped electrode terminals, which requires skilled techniques, and makes a manufacturing process complicated. Furthermore, the pouch-shaped battery has low mechanical strength, and therefore, the coupled regions are easily separated from each other due to external impacts, which may lead to defectiveness of the pouch-shaped battery.

Also, a plurality of additional members for maintaining stable coupling and assembly of a plurality of batteries are needed when the plurality of batteries are stacked one on another so as to manufacture a battery module. When a battery module is manufactured using the pouch-shaped battery, additional mounting members, such as cartridges, are used to manufacture the battery module. However, the use of the mounting members makes the assembly process of the battery module complicated and further increases the overall size of the battery module.

Another method of interconnecting the plate-shaped electrode terminals is disposed in Korean Patent Application No. 2004-112592, which has been filed in the name of the applicant of the present patent application. According to the disclosure of the above-mentioned patent application, through-holes are formed through a plurality of electrode terminals, and an additional connecting member is inserted through the through-holes, whereby the interconnection between the plate-shaped electrode terminals is accomplished. In the above-described conventional interconnecting method, however, the contacting forces between the through-holes and the connecting member are different for the respective unit cells, which changes the resistance of the battery. In addition, the plate-shaped structure, which has low mechanical strength, is used as an assembly means.

SUMMARY OF THE INVENTION

Therefore, the present invention has been made to solve the above-mentioned problems, and other technical problems that have yet to be resolved.

Specifically, it is an object of the present invention to provide a three-dimensional electrode terminal having a predetermined thickness sufficient to easily accomplish the electrical connection between pouch-shaped batteries.

It is another object of the present invention to provide a pouch-shaped battery including the three-dimensional electrode terminal.

In accordance with one aspect of the present invention, the above and other objects can be accomplished by the provision of a three-dimensional electrode terminal of a battery having an electrode assembly mounted in a pouch-shaped case, wherein a part of the electrode terminal, which is exposed from the battery case, has a predetermined thickness, and has a perpendicular surface formed on the end thereof.

Unlike conventional electrode terminals for pouch-shaped batteries, which are constructed generally in a plate-shaped structure, the electrode terminal according to the present invention is characterized in that a part of the electrode terminal, which is exposed from a pouch-shaped battery case, has a predetermined thickness sufficient to form a perpendicular surface on the end thereof, which extends in the longitudinal direction of a battery. In the case of the three-dimensional electrode terminal according to the present invention, the perpendicular surface (the perpendicular end surface) is formed at the end of the three-dimensional electrode terminal by the predetermined thickness, and therefore, the three-dimensional electrode terminal according to the present invention is different from a structure in which the end of the plate-shaped electrode terminal is perpendicularly bent to artificially form a perpendicular surface.

Consequently, the three-dimensional electrode terminal according to the present invention accomplishes easier electrical connection of the battery and more stability of connection than the conventional plate-shaped electrode terminal. Specifically, the electrode terminal has the three-dimensional perpendicular end surface and high mechanical strength, and therefore, for example, the electrical connection is accomplished by the mechanical coupling, and, even when the coupling is carried out by welding or soldering, the electrical connection of the battery is accomplished without modifying the shape of the electrode terminal. In other words, the electrical connection of the battery is very easily and conveniently accomplished. Consequently, even when the electrical connection of the electrode terminal is not easy, for example, when a plurality of batteries are stacked one on another with high density to manufacture a medium- or large-sized battery module, the electrical connection can be easily accomplished in a small space.

Generally, the electrode terminals of the pouch-shaped battery include a cathode terminal and an anode terminal. One end of each electrode terminal is connected to the corresponding one of electrodes constituting the electrode assembly, and the other end of each electrode terminal is exposed to the outside of the battery case. Consequently, "the part of the electrode terminal which is exposed from the battery case" includes the exposed end of the electrode terminal, which is exposed to the outside of the battery case, and the surroundings thereof.

According to the present invention, the "predetermined thickness" is a thickness allowing the electrical connection of the electrode terminal without artificially modifying the shape of the electrode terminal, and the predetermined thickness is a thickness allowing the electrode terminal to be formed generally in a three-dimensional structure, not in a plate-shaped structure. Consequently, the structure according to present invention is clearly distinguished from the structure in which only the end of the electrode terminal is perpendicularly bent. The structure according to the present invention may be constructed using various methods, some of which will be described below.

First, the electrode terminal may be manufactured by forming a material for the electrode terminal with the predetermined thickness. For example, a basic three-dimensional structure of the electrode terminal may be formed by die casting, and then the lower part of the electrode terminal, which is to be brought into contact with the electrode assembly in the battery case, may be formed in the shape of a plate by rolling.

Secondly, not only the end of a plate-shaped electrode terminal but also the side of the plate-shaped electrode terminal may be bent such that the perpendicular surface is formed on the end of the electrode terminal while the electrode terminal has the predetermined thickness, whereby the electrode terminal is manufactured in a three-dimensional structure. According to circumstances, the end and the side of the plate-shaped electrode terminal may be bent while a core material having a predetermined thickness is mounted in or attached to the electrode terminal, whereby the electrode terminal is manufactured in a desired three-dimensional structure.

The "perpendicular surface" or the "perpendicular end surface" includes an end surface of the electrode terminal that is inclined at a predetermined angle as well as an end surface of the electrode terminal that forms an angle of 90 degrees with respect to the level surface of the electrode terminal. The perpendicular surface or the perpendicular end surface may have various shapes.

In a preferred embodiment, the electrode terminal may be constructed such that the thickness of the electrode terminal is increased toward the end thereof.

According to circumstances, the perpendicular end surface of the electrode terminal and/or a side surface (an end side surface) of the electrode terminal, which has a predetermined thickness, may be provided with a through-hole or a depression, in which a portion of another member for performing the electrical connection (hereinafter, occasionally referred to as an "electrically connecting member") is inserted. The electrical connection includes the electrical connection for outputting power and the electrical connection for detecting current, voltage, and temperature. In the case that the through-hole or the depression has a thread part formed on the inner surface thereof (a female-screw structure), the coupling force between the electrode terminal and the electrically connecting member is increased.

The electrically connecting member, which is connected to the vertical end surface and the end side surface of the electrode terminal, is not particularly restricted so long as the electrical connection of the electrode terminal is accomplished by the electrically connecting member. For example, the electrically connecting member may be a bus bar, a wire, or a metal member having a specific shape.

In another preferred embodiment, the perpendicular end surface or the end side surface of the electrode terminal may be provided with a protrusion having a predetermined size, which facilitates the electrical connection. The protrusion may be formed in various shapes, such as a square shape and a cylindrical shape. As an example, the protrusion may be provided at the outer surface thereof with a thread part or a groove, by which the coupling force between the electrode terminal and the electrically connecting member is increased. Of course, the protrusion may be provided with the above-described through-hole or depression.

According to circumstances, a portion of the perpendicular end surface of the electrode terminal may extend from the side surface of the electrode terminal so as to form a side extension end. The side extension end may be used to facilitate the connection between the electrode terminal and the electrically connecting member by spot welding and the mechanical coupling between the electrode terminal and the electrically connecting member or an additional device (for example, another region of the battery module). Furthermore, the side extension end may be provided with the above-described through-hole or depression.

Also, the perpendicular end surface and/or the end side surface of the electrode terminal may be provided with depressions, which extend in the longitudinal direction of the electrode terminal and/or in the direction perpendicular to the longitudinal direction of the electrode terminal, respectively, the depressions facilitating the mechanical coupling of the electrode terminal with the electrically connecting member or an additional device (for example, another region of the battery module).

In accordance with another aspect of the present invention, there is provided a pouch-shaped battery including the three-dimensional electrode terminals as described above.

The pouch-shaped battery according to the present invention is constructed in a structure in which an electrode assembly is mounted in a pouch-shaped case. The pouch-shaped case means a case formed in the shape of a pouch, which is distinguished from a cylindrical case or a rectangular case, and therefore, the case according to the present invention may be formed in various shapes. The pouch-shaped case is well known in the art to which the present invention pertains, and therefore, the detailed description thereof will not be given. Typically, the pouch-shaped case may be formed using a laminate sheet of aluminum or plastic resin; however, the material for the pouch-shaped case is not limited to the above-described material.

The electrode assembly mounted in the pouch-shaped case is not particularly restricted so long as the electrode assembly has a cathode/separator/anode structure. For example, the electrode assembly may be constructed in a jelly-roll type structure or a stack type structure.

In the pouch-shaped battery according to the present invention, the electrode terminals, i.e., the cathode terminal and the anode terminal, may be disposed at the same side of the battery case, or may be disposed at different sides of the battery case. In the latter case, the cathode terminal and the anode terminal are disposed at the upper and lower ends of the battery case such that the cathode terminal and the anode terminal are opposite to each other. Also, both the cathode terminal and the anode terminal may be formed in the three-dimensional electrode terminal structure, or only one of the cathode terminal and the anode terminal may be formed in the three-dimensional electrode terminal structure.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

Figure 1:
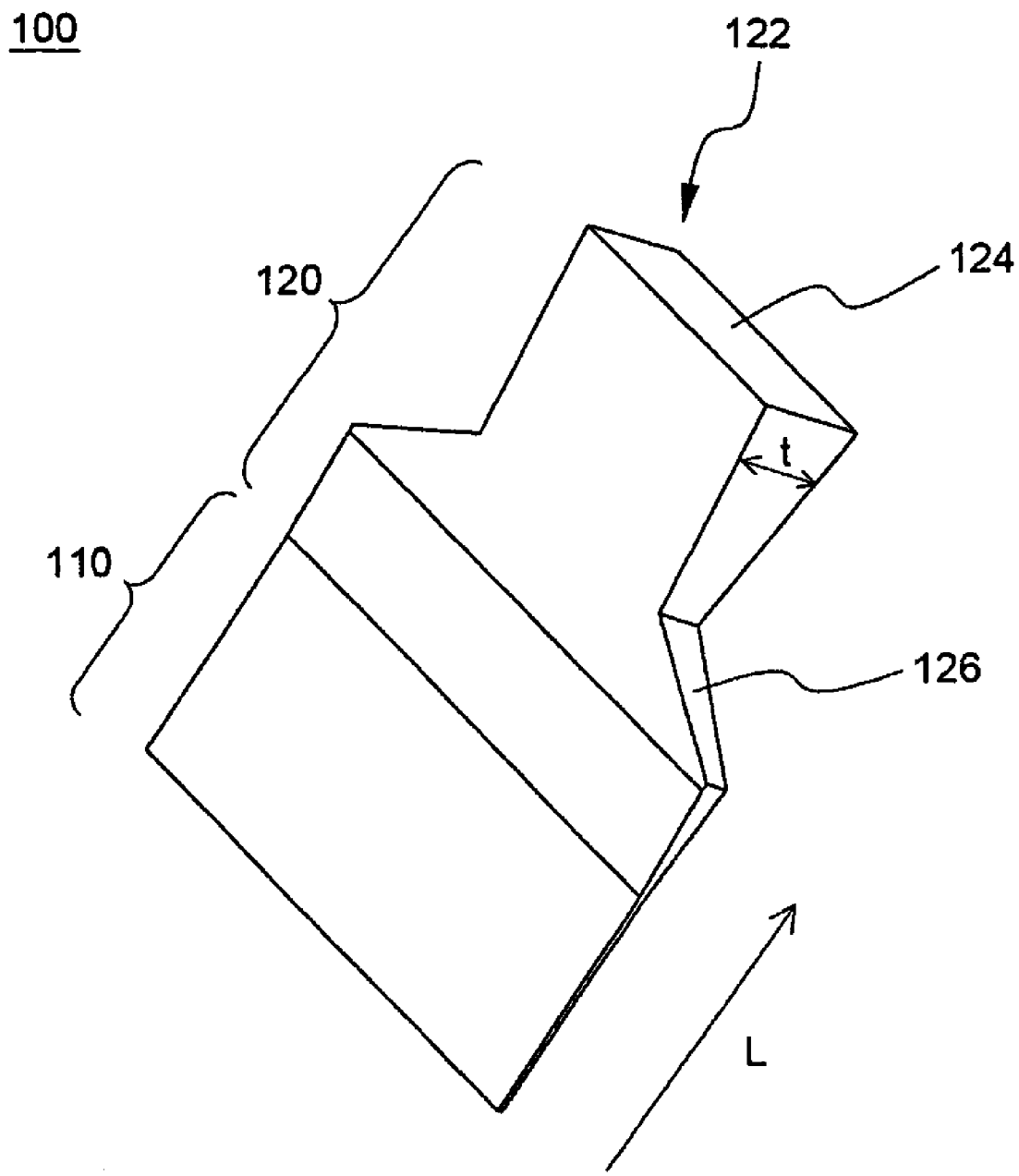
FIG. 1 is a typical view illustrating a three-dimensional electrode terminal according to a preferred embodiment of the present invention.

100: electrode terminal
110: lower part of electrode terminal
120: upper part of electrode terminal
130: protrusion
140: depression
150: through-hole
200: pouch-shaped battery
210: pouch-shaped case
220: electrode assembly

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

FIG. 1 typically illustrates the shape of a three-dimensional electrode terminal according to a preferred embodiment of the present invention.

Referring to FIG. 1, the three-dimensional electrode terminal 100 according to the present invention, which is made of a conductive material, comprises a lower part 110, which is connected to an electrode assembly (not shown) of a pouch-shaped battery, and an upper part 120, which is connected to an electrically connecting member (not shown). The lower part 110 of the three-dimensional electrode terminal 100 is formed in the shape of a thin plate, which can be tightly attached to a pouch-shaped battery case with high sealability. On the other hand, the upper part 120 of the three-dimensional electrode terminal 100 has a predetermined thickness t greater than that of the lower part 110. Also, the upper part 120 has a perpendicular surface 124 (or a perpendicular end surface) formed on the end 122 thereof, which extends in the longitudinal direction L of the battery. Furthermore, the upper part 120 is constructed such that the thickness of the upper part 120 is increased toward the end 122 thereof, and the side surface 126 thereof is tapered. Consequently, the electrode terminal 100 has a three-dimensional structure in which the electrode terminal 100 has the predetermined thickness t and the perpendicular surface 124 is formed on the end 122 of the upper part 120.

Owing to the above-described specific shape of the upper part 120, the three-dimensional electrode terminal 100 can be mechanically coupled to the electrically connecting member (not shown). Also, the electrically connecting member can be welded to the perpendicular surface 124 without modifying the shape of the electrode terminal 100. Consequently, the electrical connection of the three-dimensional electrode terminal 100 can be very easily accomplished.

FIGS. 2 to 10 are typical views respectively illustrating various modifications of the electrode terminal shown in FIG. 1.

Figure 2:
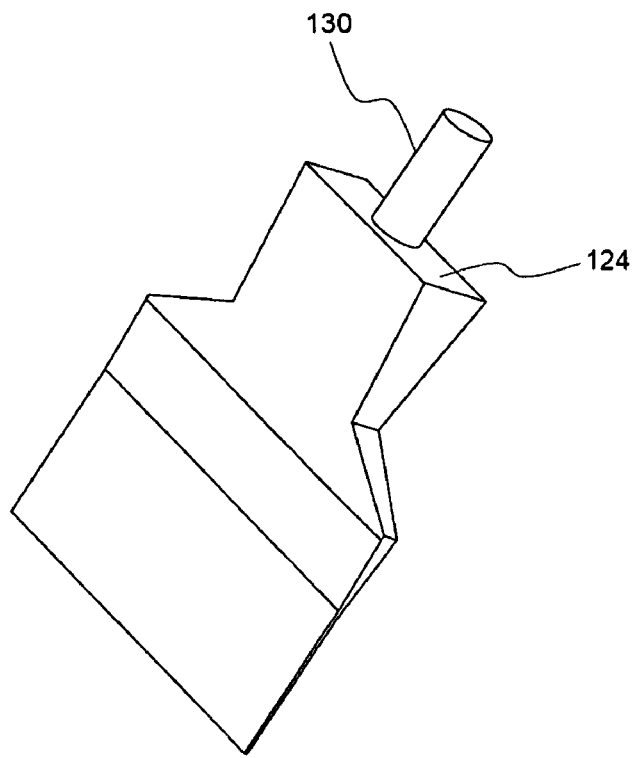
FIGS. 2 to 10 are typical views respectively illustrating various modifications of the electrode terminal shown in FIG. 1.

Referring first to FIG. 2, a cylindrical protrusion 130 is formed at the perpendicular end surface 124. The protrusion 130 facilitates the coupling between the electrode terminal 100 and the electrically connecting member. For example, a coupling groove corresponding to the protrusion 130 may be formed in the electrically connecting member such that the protrusion 130 can be inserted into the coupling groove, whereby the electrical connection between the electrode terminal 100 and the electrically connecting member is accomplished.

Figure 3:
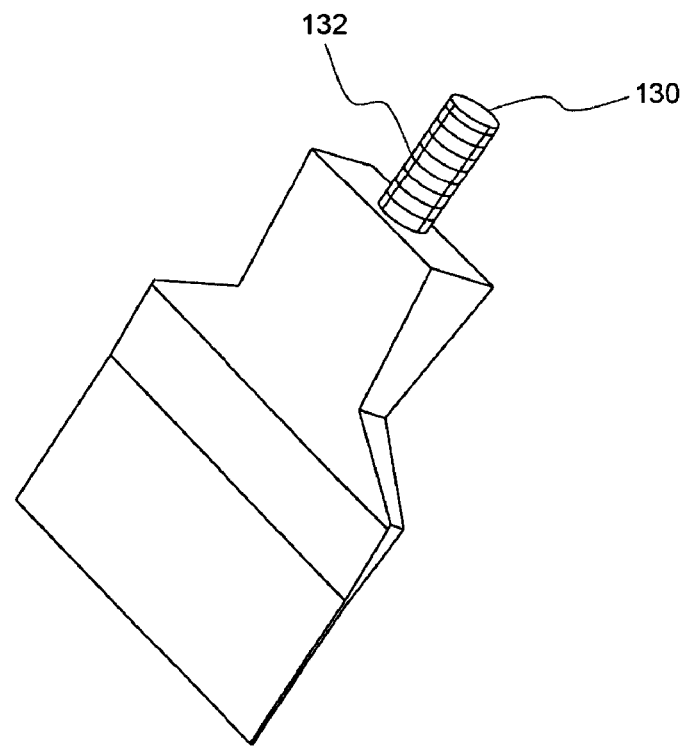

As shown in FIG. 3, a thread part 132 may be formed at the outer circumference surface of the protrusion 130. In this case, the thread part 132 increases the coupling force between the electrode terminal 100 and the electrically connecting member.

Figure 4:
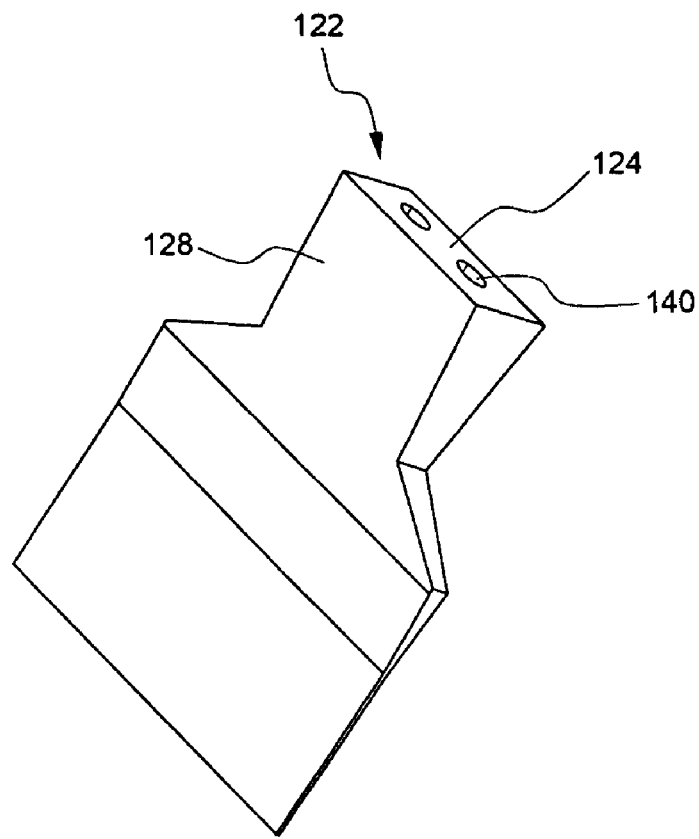
Figure 5:
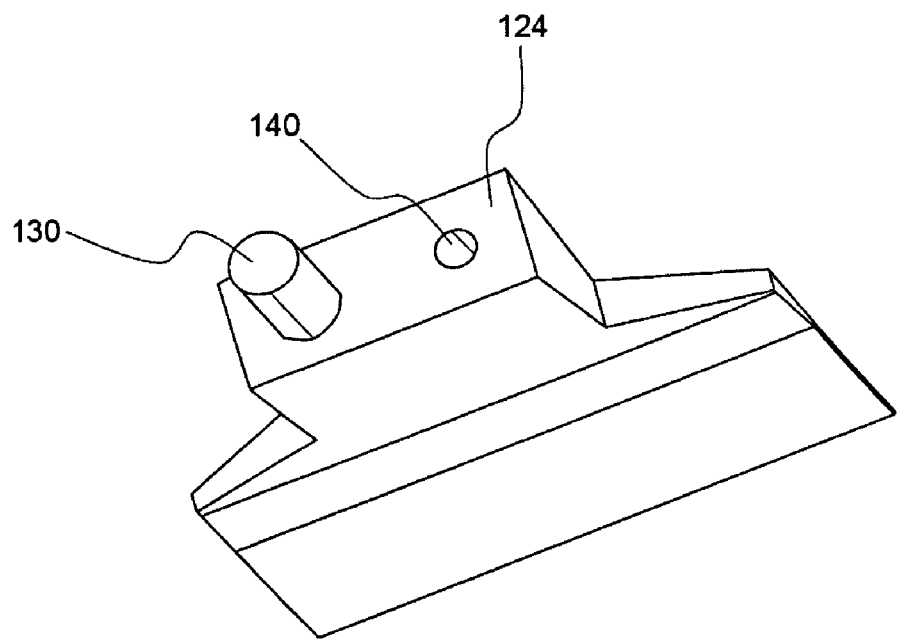
Figure 6:
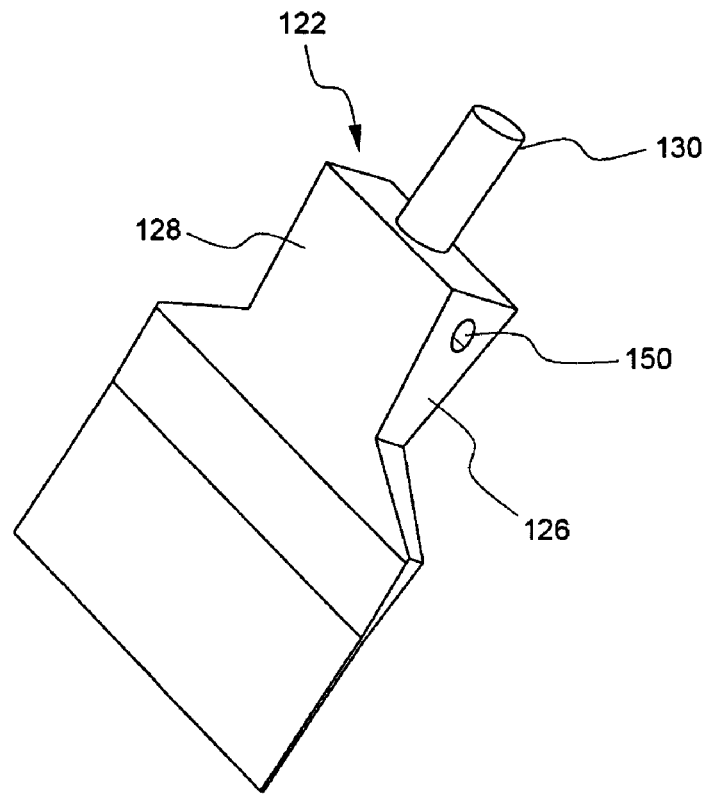

Alternatively, as shown in FIGS. 4 to 6, one or more depressions 140 may be formed in the perpendicular end surface 124, or one or more through-holes 150 may be formed in the side surface 126 of the end 122, such that the electrode terminal 100 can be coupled with the electrically connecting member through the one or more depressions 140 or the one or more through-holes 150, whereby the electrical connection between the electrode terminal 100 and the electrically connecting member is accomplished. The depressions 140 and the through-holes 150 may be formed in the upper end surface 128 of the end 122 or in the protrusion 130. The number of the depressions 140 and the through-holes 150 may be appropriately decided as occasion demands. Especially, the electrically connecting member coupled to the depressions 140 and the through-holes 150 may be used to detect the voltage, the current, and the temperature of the battery. In FIGS. 5 and 6, for example, the electrical connection for outputting power may be accomplished by the protrusion 130, and electrical connection for detecting voltage, current, and temperature may be accomplished by the depressions 140 and the through-holes 150.

Figure 7:
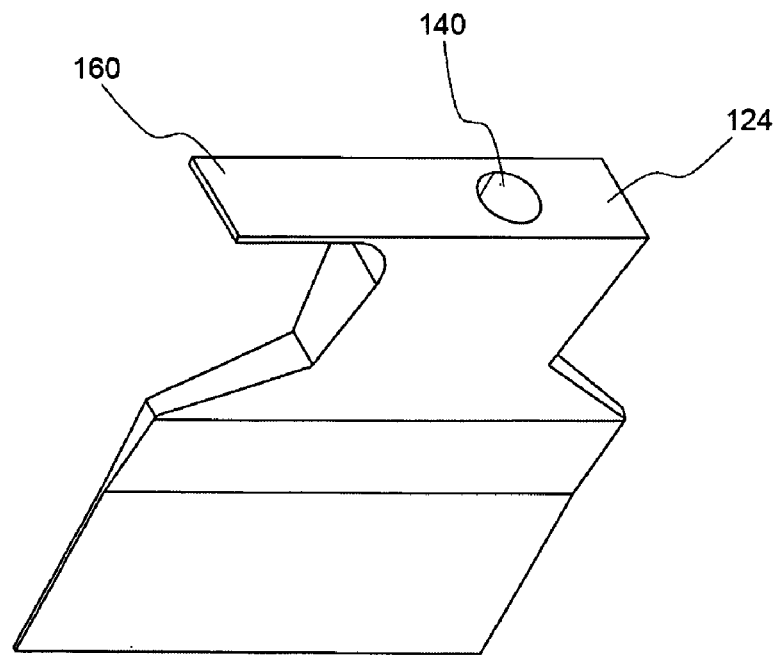
Figure 8:
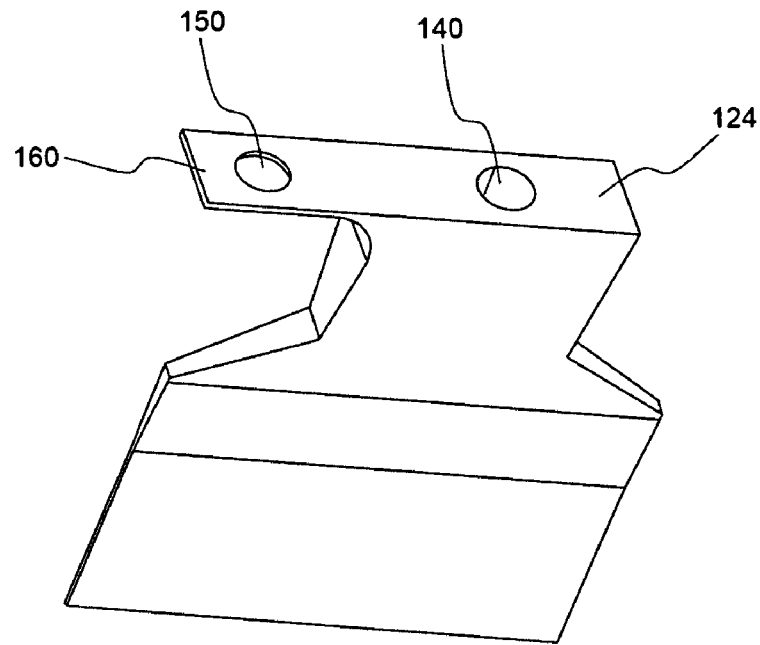

FIGS. 7 and 8 illustrate other modifications of the three-dimensional electrode terminal according to the present invention. Referring to FIGS. 7 and 8, a portion of the perpendicular end surface 124 extends from the side surface of the end of the electrode terminal. The side extension end 160 of the perpendicular end surface 124 is particularly useful when welding tips (not shown) are brought into contact with the upper and lower ends of the side extension end 160 such that the electrode terminal and the electrically connecting member are coupled with each other by spot welding while the electrically connecting member (not shown) is located on the upper end of the side extension end 160. In the case that a through-hole 150 is formed in the side extension end 160, as shown in FIG. 8, it is also possible to mechanically couple the electrode terminal and the electrically connecting member with each other through the through-hole 150. In the other part of the perpendicular end surface 124 is also formed a depression 140 for outputting power or detecting voltage, current, and temperature.

Figure 9:
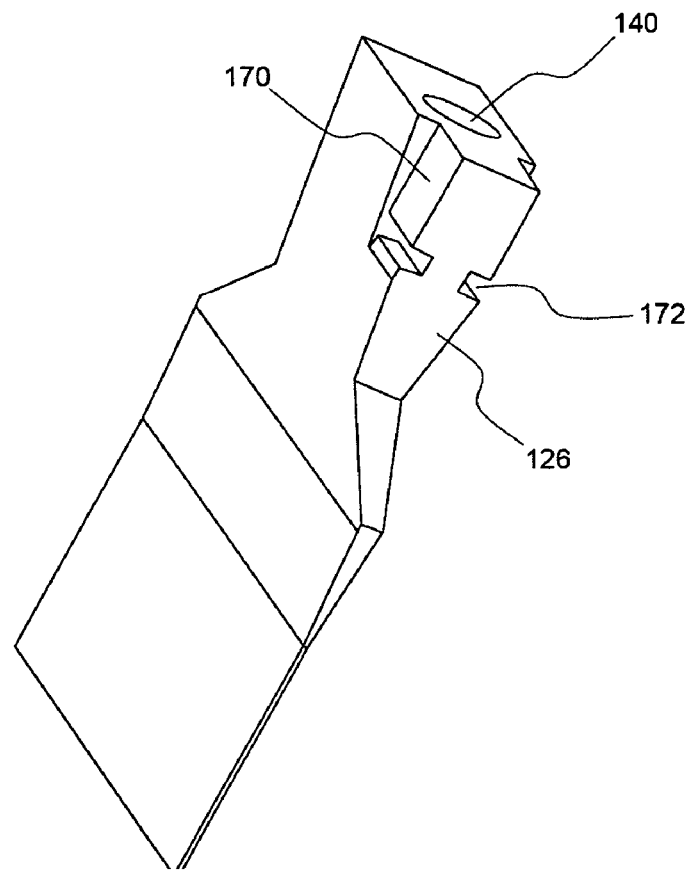
Figure 10:
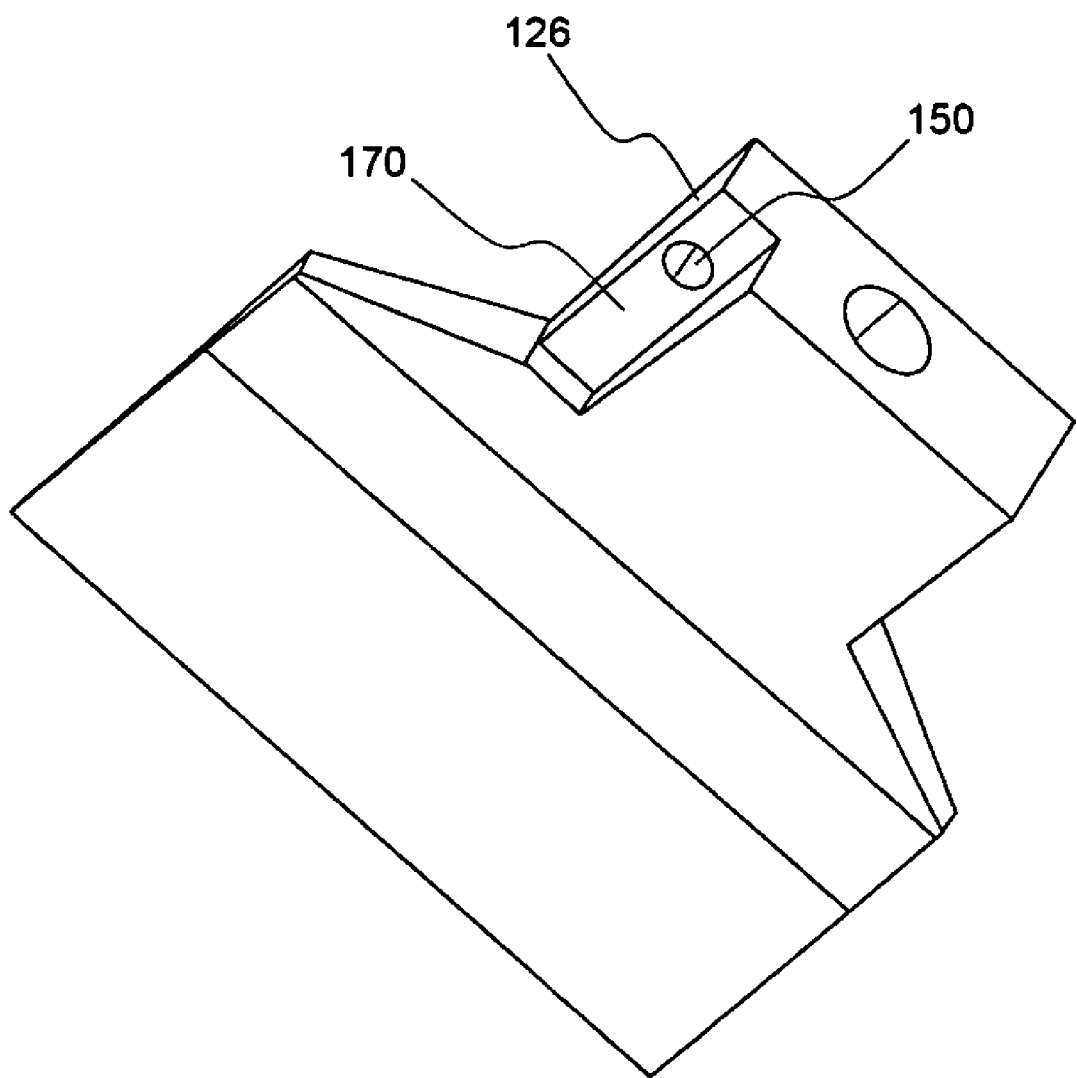

The perpendicular end surface 124 and/or the end side surface 126 may be modified for various purposes. Referring first to FIG. 9, depressions 170 and 172 are formed in a portion of the end side surface 126 such that the depressions 170 and 172 extend in the longitudinal direction of the electrode terminal and in the direction perpendicular to the longitudinal direction of the electrode terminal, respectively. The depressions 170 and 172 facilitate the mechanical coupling of the electrode terminal with the electrically connecting member or other regions of a battery module. In addition to the mechanical coupling, the electrical connection is also simultaneously accomplished by the depressions 170 and 172. Alternatively, as shown in FIG. 10, a depression 170 is formed in a portion of the end side surface 126 such that the depression extends in the longitudinal direction of the electrode terminal, and a through-hole 150 is formed in the middle part of the depression 170. Consequently, the connecting member (not shown) is prevented from protruding in the perpendicular direction of the electrode terminal when the electrical connection for outputting power or detecting voltage, current, and temperature is performed through the through-hole 150.

The three-dimensional electrode terminal according to the present invention may be formed in various shapes having different thicknesses and different perpendicular end surfaces in addition to the above-described structure.

Figure 11:
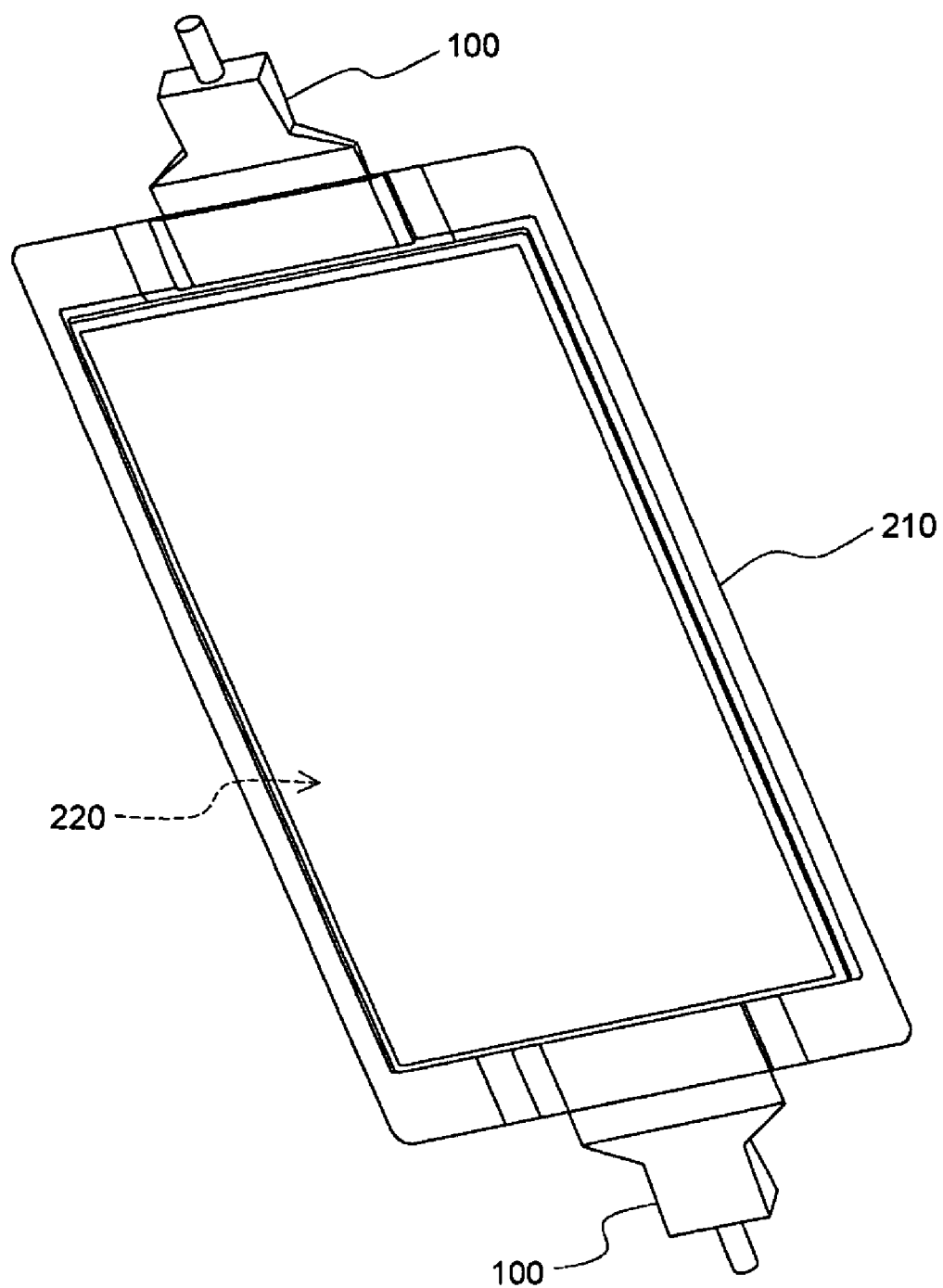
FIG. 11 is a typical view illustrating a pouch-shaped battery according to a preferred embodiment of the present invention, which includes the three-dimensional electrode terminal shown in FIG. 2.

FIG. 11 is a typical view illustrating a pouch-shaped battery according to a preferred embodiment of the present invention.

Referring to FIG. 11, the pouch-shaped battery 200 is constructed in a structure in which an electrode assembly 220 including cathodes, separators, and anodes is mounted in a pouch-shaped case 210. The electrode assembly 220 is electrically connected to three-dimensional electrode terminals 100 according to the present invention, which are disposed at the upper and lower ends of the case 210. According to circumstances, the electrode terminals 100 may be disposed at the upper end of the case 210, or may be disposed at the upper end and the side of the case 210.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the three-dimensional electrode terminal for pouch-shaped battery according to the present invention has a predetermined thickness and a perpendicular end surface. Consequently, it is possible to easily accomplish the connection between the electrode terminal and the electrically connecting member without modifying the shape of the electrode terminal. Preferably, it is possible to easily accomplish the connection for detecting the voltage, the current, and the temperature of the battery.

Furthermore, the mechanical strength of the three-dimensional electrode terminal according to the present invention is higher than that of the conventional plate-shaped electrode terminal. Consequently, the stability of the three-dimensional electrode terminal is high in the state that the electrode terminal is electrically connected with the electrically connecting member, and the electrical connection is easily accomplished even in a small space, especially when batteries are stacked one on another with high density so as to manufacture a medium- or large-sized battery module.

What is claimed is:

1. A thee-dimensional electrode terminal of a battery constructed wholly in a plate shape and having an electrode assembly, which comprises electrodes, mounted in a pouch-shaped battery case, the three-dimensional electrode terminal comprising:

an upper part exposed from the pouch-shaped battery case, the upper part having a predetermined thickness, and a perpendicular surface formed on an upper end thereof; and a lower part mounted in the pouch-shaped battery case, the lower part being directly connected to one of the electrodes of the electrode assembly and having a plate shape and a thin thickness; wherein the upper part is integrally formed with the lower part and is thicker than the lower part, and the end and the side of a plate-shaped electrode terminal are bent such that the perpendicular surface is formed on the end of the electrode terminal while the electrode terminal has the predetermined thickness, whereby the electrode terminal is manufactured in a three-dimensional structure.

2. The electrode terminal according to claim 1, wherein the end and the side of the plate-shaped electrode terminal are bent while a core material having a predetermined thickness is mounted in or attached to the electrode terminal, whereby the electrode terminal is manufactured in a desired thee-dimensional structure.

3. The electrode terminal according to claim 1, wherein the electrode terminal is constructed such that the thickness of the upper part of the electrode terminal is increased toward the upper end thereof 4. The electrode terminal according to claim 1, wherein at least one of the perpendicular end surface of the electrode terminal and/or a side surface (an end side surface) of the electrode terminal, which has a predetermined thickness, is provided with a through-hole or a depression.

5. The electrode terminal according to claim 4, wherein the though-hole or the depression has a thread part formed on the inner surface thereof.

6. The electrode terminal according to claim 1, wherein one of the perpendicular end surface and an end side surface of the electrode terminal is provided with a protrusion, which facilitates the electrical connection.

7. The electrode terminal according to claim 6, wherein the protrusion is provided at the outer surface thereof with a thread part or a groove.

8. The electrode terminal according to claim 1, wherein a portion of the perpendicular end surface of the electrode terminal extends from the side surface of the electrode terminal so as to form a side extension end.

9. The electrode terminal according to claim 1, wherein at least one of the perpendicular end surface and an end side surface of the electrode terminal is provided with depressions, which extend in at least one of the longitudinal direction of the electrode terminal and/or in the direction perpendicular to the longitudinal direction of the electrode terminal, respectively, the depressions facilitating the mechanical coupling of the electrode terminal with an electrically connecting member or an additional device.

10. A pouch-shaped battery constructed wholly in a plate shape, the pouch-shaped battery comprising:

a three-dimensional electrode terminal having an electrode assembly, which comprises electrodes, mounted in a pouch-shaped battery case, the three-dimensional electrode terminal comprising:

an upper part exposed from the pouch-shaped battery case, the upper part having a predetermined thickness and a perpendicular surface formed on an upper end thereof; and a lower part mounted in the pouch-shaped battery case, the lower part being directly connected to one of the electrodes of the electrode assembly and having a plate shape and a thin thickness; wherein the upper part is integrally formed with the lower part and is thicker than the lower part, and the end and the side of a plate-shaped electrode terminal are bent such that the perpendicular surface is formed on the end of the electrode terminal while the electrode terminal has the predetermined thickness, whereby the electrode terminal is manufactured in a three-dimensional structure.

11. The pouch-shaped battery according to claim 10, wherein the electrode terminals comprise, cathode terminal and an anode terminal;

wherein the electrode terminals are disposed at one of the same side of the pouch-shaped battery case, and at different sides of the pouch-shaped battery case.

12. The pouch-shaped battery according to claim 11, wherein at least one of the cathode terminal and the anode terminal is the three-dimensional electrode terminal.

* * * * *